Jan. 1, 1952  F. V. H. JUDD  2,580,789
ADJUSTABLE PROPELLER CUFF
Filed Nov. 5, 1945  2 SHEETS—SHEET 1

INVENTOR.
FREDERICK V. H. JUDD
BY Ernest D. Given
ATTORNEY

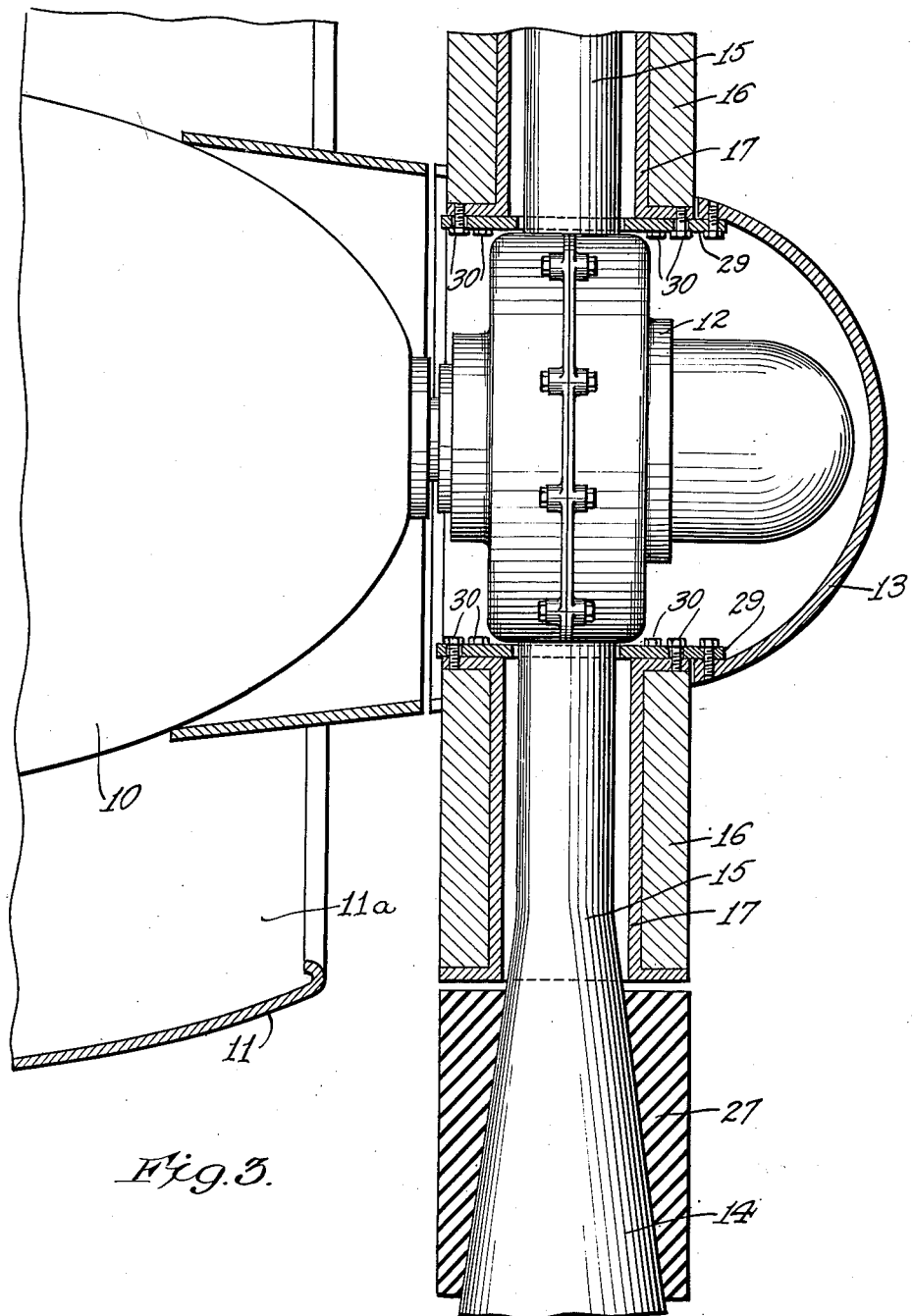

Patented Jan. 1, 1952

2,580,789

UNITED STATES PATENT OFFICE 2,580,789

ADJUSTABLE PROPELLER CUFF

Frederick V. H. Judd, Canton, Conn., assignor to United Aircraft Corporation, East Hartford, Conn., a corporation of Delaware Application November 5, 1945, Serial No. 626,647

4 Claims. (Cl. 170—135.743)

This invention relates to aircraft propellers and has for its object to increase the effectiveness of such propellers in cooling the aircraft engine.

Another object of the invention is to increase the cooling effect of the cuff or shank fairing of a variable pitch aircraft propeller.

Still another object is to provide a novel and improved combination of variable pitch propeller blades and cuffs in which the blades and cuffs are relatively adjustable to insure maximum operating efficiency.

Various other objects and advantages will be apparent as the nature of the invention is more fully disclosed.

As is well known, the shank of an aircraft propeller blade is normally substantially cylindrical and gradually fairs into a blade shape. This normally cylindrical portion is now often encased in a member called a cuff or shank fairing which is of substantially blade shape and is intended to produce an air stream useful in cooling the engine.

I have now discovered that the cooling effectiveness of a blade cuff of the foregoing type may be materially increased by mounting the cuff independently of the blade and making the two relatively adjustable to control the slip-stream velocity in accordance with various operating conditions.

In one embodiment of the invention, hereinafter described, the cuffs or shank fairings are detached from the blades of a variable pitch aircraft propeller, and means are provided for adjusting the pitch of the cuffs independently of the propeller blades. In another embodiment the cuffs are secured directly to the propeller hub or to the spinner on the nose section, independently of the variable pitch blades, with sufficient adjustment provided to enable the optimum setting of the cuffs to be determined experimentally.

At the critical engine cooling conditions of climb, take-off and ground running, the angle of the variable pitch propeller blades is low, and for most effective cooling the cuffs should be at a high angle to increase the pressure of the cooling stream of air. The present invention provides a simple and efficient means for accomplishing this result, and, in the case of the variable pitch cuffs controlled by the pilot as hereinafter described, enables the settings of the cuffs and blades to be varied independently and at will, according to operating requirements.

Although the novel features which are characteristic of this invention are set forth more in detail in the claims appended hereto, the nature and scope of the invention may be better understood by referring to the following description, taken in connection with the accompanying drawing forming a part thereof, in which certain specific embodiments have been set forth for purposes of illustration.

In the drawing:

Fig. 3 is a similar view illustrating a modification of the invention.

In the following description certain specific terms are used for convenience in referring to the various details of the invention. These terms, however, are to be interpreted as broadly as the state of the art will permit.

Figure 1:
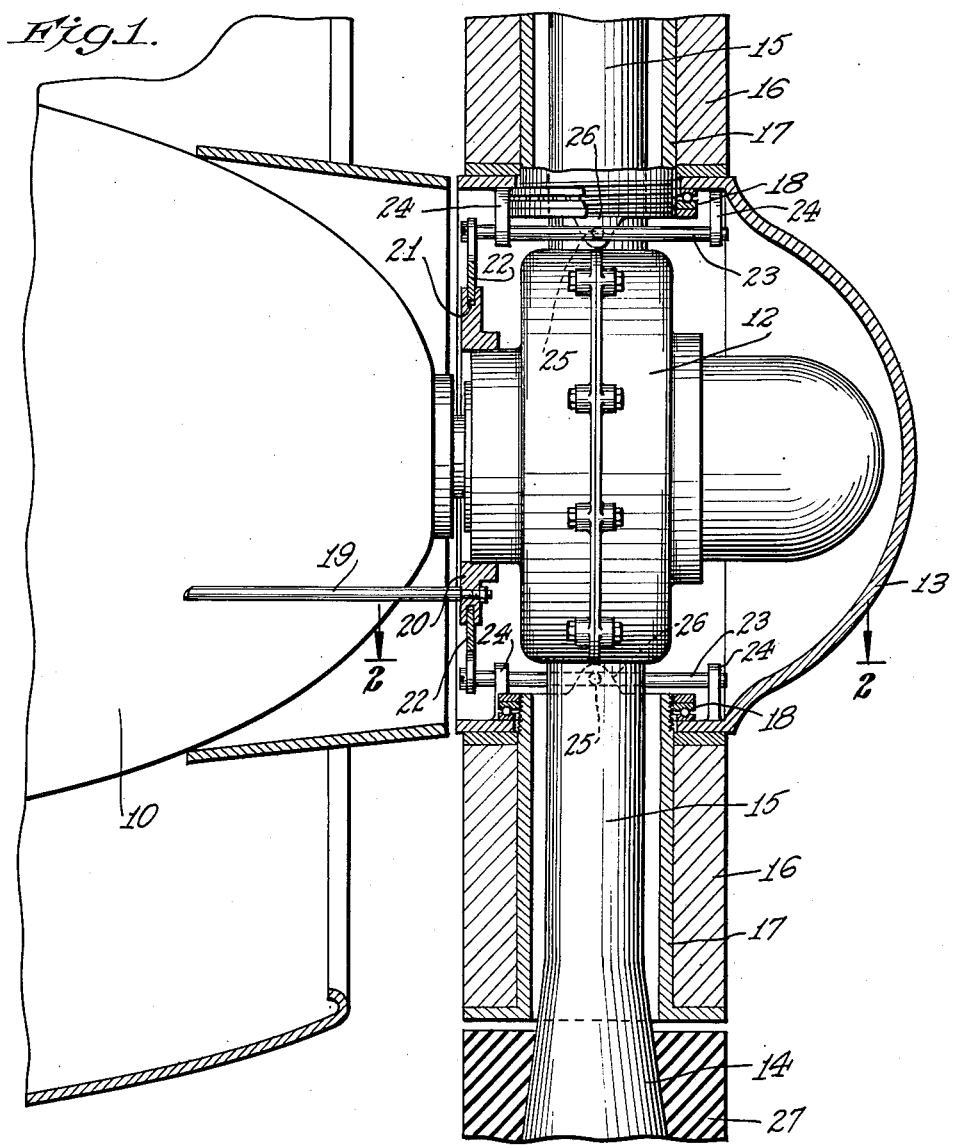
Figure 1 is a diagrammatic sectional view through the nose section of an airplane having independently adjustable propeller blades and cuffs in accordance with the present invention.

In the drawing, Fig. 1 shows the nose section 10 of an airplane power plant driving the rotatable propeller hub 12 and the surrounding spinner 13. The power plant is enclosed in a conventional cowling as shown diagrammatically at 11 in Fig. 1, thus providing an annular space 11a through which air flows for cooling the power plant.

A plurality of propeller blades 14 have their shanks 15 journaled in suitable bearings (not shown) in the hub 12, permitting said blades to be rotated axially in the hub 12 for pitch adjusting purposes. Any suitable means may be employed for thus varying the pitch of the blades 14. The rotatable members including the hub 12, the blades 14, the spinner 13 and parts rotated therewith by the power plant may be termed the propeller assembly.

Surrounding the substantially cylindrical shank 15 of each propeller blade 14, and detached from said shank, is a cuff or fairing member 16 of any suitable material having a flanged cylindrical liner 17 which is journaled in a bearing 18 carried by the spinner 13, permitting said cuff 16 to be rotated axially upon said bearing. If desired, however, the cuff 16 may be rotatably mounted on the hub 12 instead of on the spinner 13.

Figure 2:
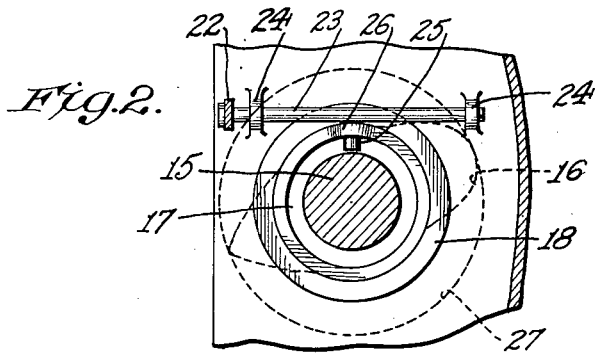
Fig. 2 is a fragmentary transverse section taken on line 2—2 of Fig. 1.

The cuffs 16 may be rotated axially on their bearings 18 in any desired manner. The adjusting means illustrated schematically in Fig. 1 comprises a control rod 19 operated by the pilot of the airplane and movable to the right or left as viewed in Fig. 1. The rod 19 actuates a flanged collar 20 which is loosely mounted on the rotatable propeller hub 12, enabling the non-rotating collar 20 to be moved axially of the hub 12. The collar 20 contains a peripheral slot 21 into which extends the arms 22 which are secured to rods 23, Figs. 1 and 2, slidably mounted in bearings 24 on the spinner 13, there being one such arm 22 and rod 23 for each propeller blade 14. Each rod 23 has a pin 25 loosely engaged in a hole formed in a lug 26 on the cuff liners 17 of the respective propeller blades. Movement of the control rod 19 to the right or left, as viewed in Fig. 1, causes corresponding movement of the non-rotatable collar 20, the arms 22, rods 23 and pins 25, thereby rotating the cuffs 16 upon their bearings 18. The cuffs 16 may thus be rotated or twisted axially to vary their pitch independently of the propeller blades 14.

In the embodiment illustrated in Fig. 1, the cuff 16 surrounds the shank 15 of blade 14 for only a limited distance, encompassing that portion of the shank which is substantially cylindrical in cross-section. The outer portion of the shank which gradually fairs into a propeller blade shape is encased in a fixed fairing section 27 of rubber or other suitable material.

Fig. 3 illustrates a modification of the invention, in which the cuff 16 is secured directly to a place 29 which is rigidly secured to the spinner 13 or to the hub 12. In the form illustrated, the cuff is secured to plate 29 by means of bolts 30 which extend through the inner flange of cuff liner 17 and through arcuate holes in plate 29. By suitably adjusting the cuff 16 before tightening the bolts 30 the optimum setting of the cuff may be determined experimentally. After the desired adjustment has been effected the cuff 16 remains fixed in flight, while the blades 14 may be rotated in flight to vary their pitch as in the embodiment previously described. This adjustment in the form shown in Fig. 3 would require a disassembly of the propeller assembly to give access to the bolts 30. It is contemplated, however, that other devices having equivalent functions could be arranged to give easier access for providing this adjustment.

Although certain specific embodiments have been shown and described herein for purposes of illustration, it will be evident to those skilled in the art that the invention is capable of various modifications and adaptations within the scope of the appended claims.

What is claimed is:

1. The combination with an aircraft power plant having a cowling spaced therefrom to provide an annular space for air flow around the power plant, a propeller assembly including a plurality of adjustable pitch blades, and a spinner forming a part of said assembly, of a plurality of cuffs carried by said spinner, each said cuff surrounding and spaced from a shank portion of each of said blades respectively, each of said cuffs being formed as a fan blade, so as to force air through said annular space upon the rotation of said propeller assembly, means independent of the pitch of said blades for adjustably securing said cuffs respectively to said spinner including a plurality of bolts and a flange member rigidly carried by each said cuff and having arcuate slots through which said bolts pass and are threaded into a part of said spinner, said slots being arranged substantially concentric with the shank portions of the associated blade shank, so that said cuffs may be adjusted by loosening said bolts, manually turning said cuffs to any predetermined pitch position thereof within the limits of adjustment, and then tightening said bolts to secure the adjustment when made, the cuff adjusting means being so constructed and arranged that the pitch adjustment of said cuffs will be effective to control air flow through said annular space for any given speed of rotation of said propeller assembly.

2. The combination with an aircraft power plant having a cowling spaced therefrom to provide an annular space for air flow around the power plant, and a propeller assembly rotatable about a predetermined axis and including a plurality of adjustable pitch blades, of a spinner forming a part of said assembly, a plurality of cuffs carried by said assembly, each said cuff surrounding and spaced from a shank portion of each of said blades respectively, said cuffs being at least to a substantial extent aligned with said annular space in a direction parallel with the axis of rotation of said propeller assembly, each of said cuffs being formed as a fan blade, so as to force air through said annular space during the rotation of said propeller assembly, means independent of the pitch of said blades for supporting said cuffs from said assembly so that said cuffs may be rotatably adjusted about the longitudinal axes of the respectively associated blades including a bearing means intermediate said assembly and each of said cuffs arranged substantially concentric with the shank portions of said blades respectively; and means independent of the pitch of said blades and any adjustments thereof for simultaneously rotatably adjusting the pitch of all said cuffs about the axes of their respectively associated blades, including a means articulated to each of said cuffs and mounted for rotation with said propeller assembly and movable axially thereof, means nonrotatable with said assembly and mechanically connected so as simultaneously to move all the last named means, and means for moving said non-rotatable means axially in respect to said assembly.

3. The combination with an aircraft power plant having a cowling spaced therefrom to provide an annular space for air flow around the power plant, a propeller assembly including a plurality of adjustable pitch blades, and a spinner forming a part of said assembly, of a plurality of cuffs carried by said spinner, each said cuff surrounding and spaced from a shank portion of each of said blades respectively, each of said cuffs being formed as a fan blade for forcing air through said annular space upon the rotation of said propeller assembly, and means for mounting each of said cuffs on said spinner and for adjustably varying the pitch of said cuffs, the last named means being independent of said blades and of the pitch adjustment thereof.

4. Apparatus in accordance with claim 3, wherein said last named means includes means operable during the rotation of said propeller assembly in use for adjustably varying the pitch of said cuffs.

FREDERICK V. H. JUDD.

REFERENCES CITED

The following references are of record in the file of this patent:

UNITED STATES PATENTS

| Number | Name | Date |
|---|---|---|
| 1,990,979 | Chilton | Feb. 12, 1935 |
| 2,018,012 | Chilton | Oct. 22, 1935 |
| 2,030,578 | Flettner | Feb. 11, 1936 |
| 2,098,565 | Chilton | Nov. 9, 1937 |
| 2,125,187 | Lansing | July 26, 1938 |
| 2,133,253 | Myers | Oct. 11, 1938 |
| 2,162,794 | Asboth | June 20, 1939 |
| 2,270,912 | Theodorsen | Jan. 27, 1942 |
| 2,289,400 | Woods | July 14, 1942 |
| 2,309,466 | Martin | Jan. 26, 1943 |
| 2,322,763 | Martino | June 29, 1943 |
| 2,330,622 | Ramshorn | Sept. 28, 1943 |
| 2,396,598 | Neumann et al. | Mar. 12, 1946 |
| 2,405,422 | Halford et al. | Aug. 6, 1946 |